C. L. BURGER.
MARINE VESSEL.
APPLICATION FILED NOV. 30, 1909.
954,713.
Patented Apr. 12, 1910.
3 SHEETS—SHEET 1.
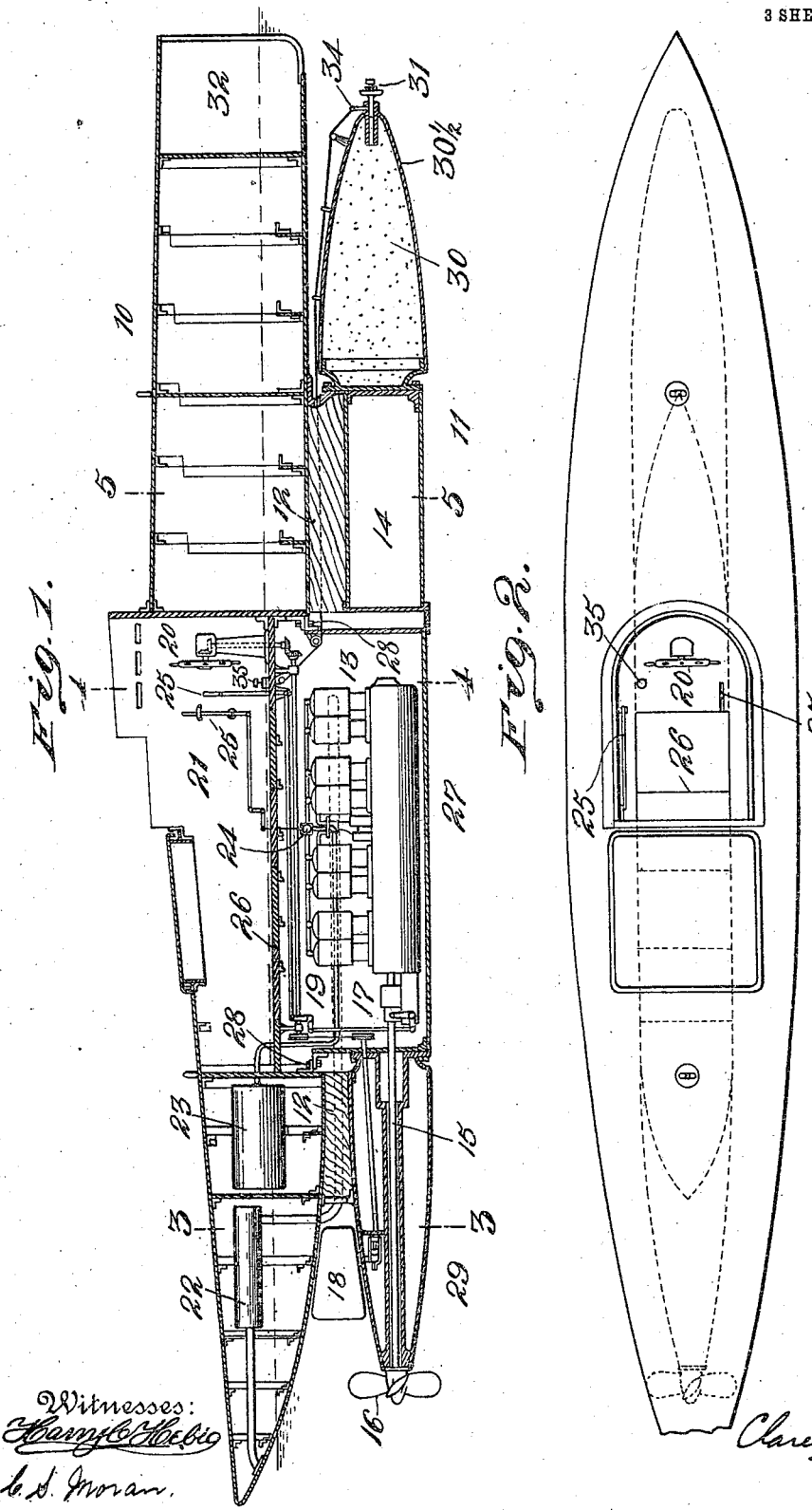

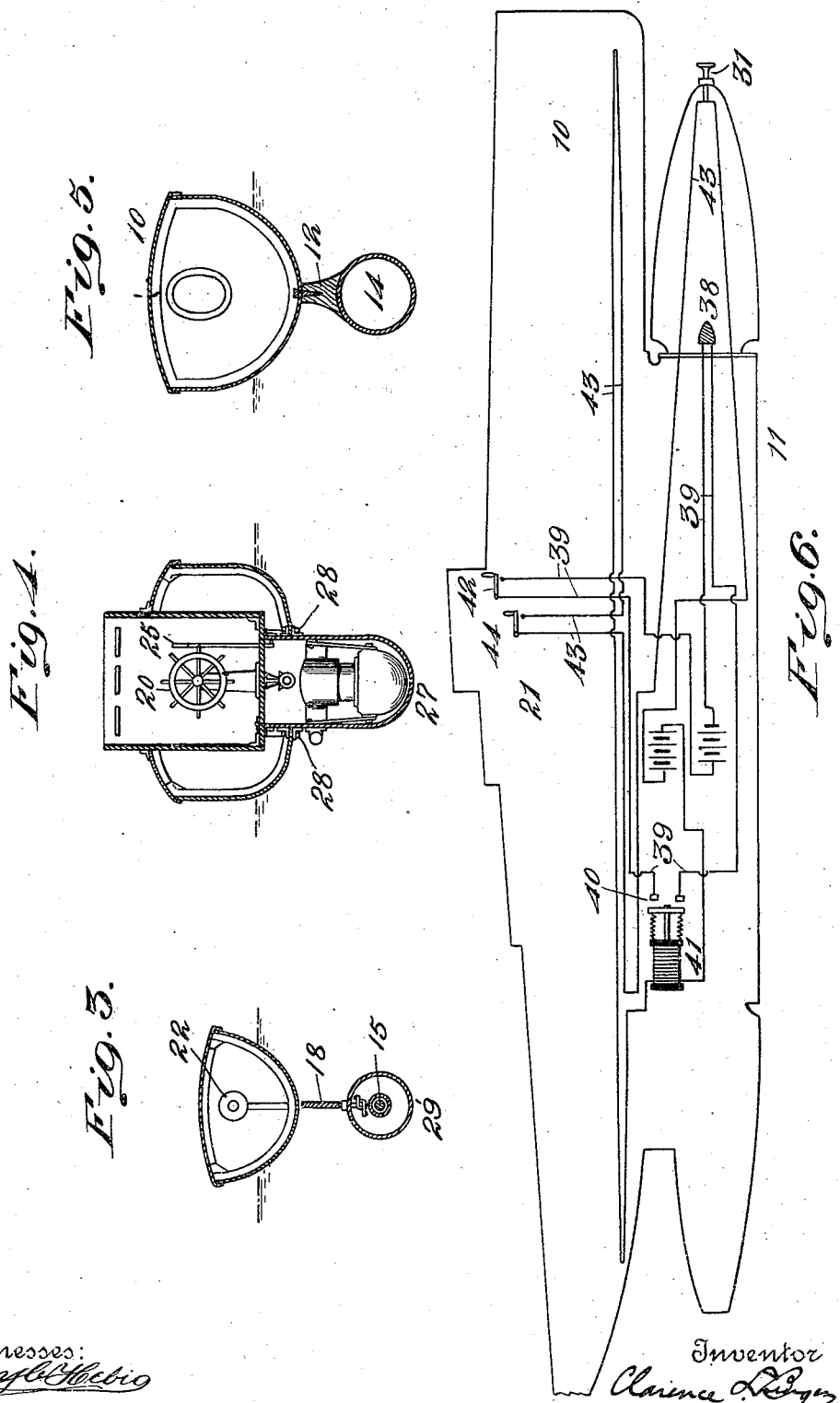

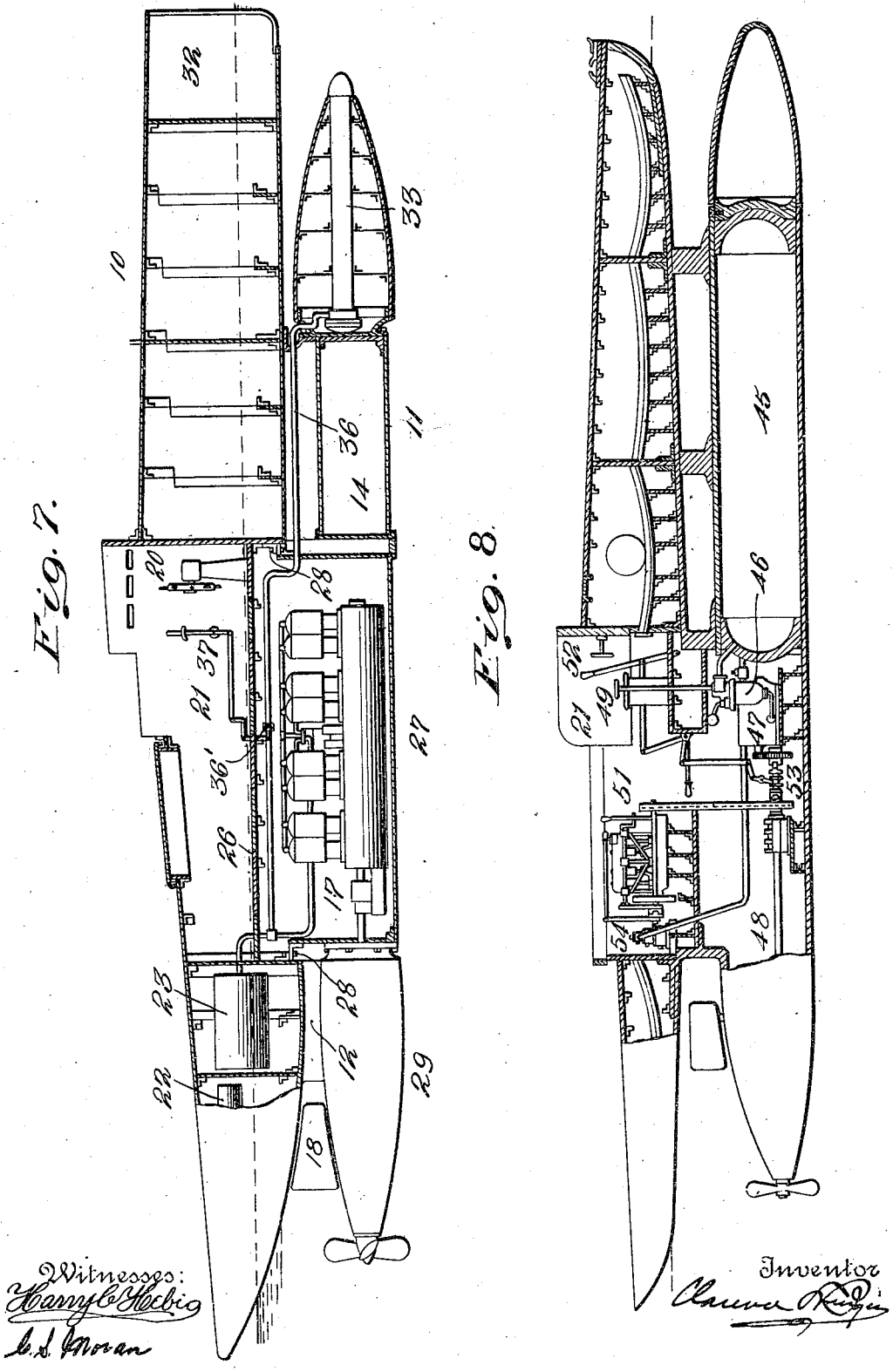

UNITED STATES PATENT OFFICE.

CLARENCE LIVINGSTON BURGER, OF NEW YORK, N. Y.

MARINE VESSEL.

954,713.  Specification of Letters Patent. Patented Apr. 12, 1910.

Application filed November 30, 1909. Serial No. 530,667.

*To all whom it may concern:*

Be it known that I, CLARENCE L. BURGER, residing in the city, county, and State of New York, have invented a new and useful Improvement in Marine Vessels; and I do hereby declare that the following is a full, clear, and exact description of the same.

Most of the improvements comprising my present invention are particularly intended for naval vessels of a double-hull character invented by me, and named by me "Subsurface," and patented by me in the United States August 22nd, 1899, and also in Great Britain, France, Germany, Austria, Italy, Japan, Spain, Denmark, Sweden, Portugal and other foreign countries; but some of the features of my invention are applicable also to vessels of the ordinary single-hull or surface type. In my said patented vessels, which owing to their immunity from gun fire have been authorized by the United States Government for torpedo boat destroyers, torpedo boats and dirigible torpedoes, a submerged hull containing the vitals is suspended from a communicating surface hull, preferably made unsinkable by being divided into compartments packed with cellulose, so that the vitals are protected from direct gun fire, and from shells exploding in the surface hull by the intervening water, while, owing to the communication with the surface hull, combustion engines can be used to give the high speed of the ordinary surface torpedo boat, whose clear vision, ventilation, and habitability, maneuvering and cruising ability are likewise retained. In my said patented vessels, my idea was to make the submerged hull large enough in cross-section to leave ample room around the motors for the engine force to work, control, oil, and adjust the motors, and a room for the torpedo crew to handle and fire the torpedoes, the waist forming the communication with the surface hull being large enough to serve as a companionway for the crew, as well as an airshaft. This idea necessitated a cross-section and consequent displacement for the submerged hull which, in "subsurface" boats of small size, was large in proportion to the power that could be installed, so that their speed, maneuvering ability and cruising ability was inferior to that of surface boats.

My new idea, the primary feature of my present invention, was the conception that by restricting the cross-section of the submerged hull to the envelopment or close confinement of the motor, torpedo and other vitals, without the crew space; providing quarters for the attendants in the surface hull, and connecting the motor and torpedo, through the waist as a communicating duct, to controls accessible to the attendants in the surface hull, the cross-section and consequent displacement of the vessel would be enormously diminished, and its speed, maneuvering and cruising ability enormously increased, while at the same time the attendants in the surface hull could efficiently control the motor, helm and torpedo, and work the vessel, all with a clear view of the vessel's objective and operations. Further, if necessary, or in case of casualties, one attendant could handle the motor, helm and torpedo and thus alone work the vessel.

My invention also consists in providing the submerged hull with an outwardly removable section, carrying or merely covering the motor closely confined therein, so that by raising the boat out of water, easy access may be had to all parts of the motor for extraordinary adjustments or repairs.

My invention consists also in making of my said patented vessel or of one of ordinary form, a giant dirigible or "human" torpedo, by fixing in the submerged hull of my said patented vessel, or the bow of an ordinary vessel, a charge of high explosive acting as a fixed torpedo, which under the control of the attendant will be exploded automatically by a firing pin or other device operated by exterior contact, when the vessel strikes its objective. In use the navigator directs this dirigible torpedo toward the hostile vessel until within proper range, then sets the helm and the automatic exploding device and deserts the dirigible torpedo in a life buoy or small boat, when the dirigible torpedo continues its course until it strikes the hostile vessel and explodes and sinks or destroys the hostile vessel.

My invention also consists in extending an electric explosion producing circuit or other exploding device operated by external contact around the said dirigible torpedo in proximity to the exterior thereof, so that if a hostile vessel should ram the said dirigible torpedo, it would operate said exploding device, explode the dirigible torpedo and thereby be itself sunken or destroyed.

My invention also consists in relatively weakening the bow of the surface hull of my patented vessel when used as a dirigible torpedo and when said bow for the sake of buoyancy projects beyond the bow of the submerged hull, so that on striking the hostile vessel, the surface bow will collapse and allow the contact-exploding device in the bow of the submerged hull to strike the hostile vessel and explode the dirigible torpedo.

My invention also comprises a compressed air or other fluid accumulator and propelling motor in the submerged hull, under the control of the attendant, for securing an exceptionally high rate of speed for my patented vessel while under fire; a cruising motor in the surface hull for propulsion while not under fire; an air compressor or other fluid condenser for charging the fluid accumulator; and means controlled by the attendant for connecting at will the cruising motor with the fluid condenser or with the propeller, or the compressed fluid motor with the propeller.

In order that my invention may be fully understood, I shall first describe in detail the mode in which I carry the same into practice, and then point out its various features in the claims.

Reference is to be had to the accompanying drawings forming part of this specification, in which like numbers designate corresponding parts in all the figures.

Figure 1, is a longitudinal, sectional elevation of a naval vessel of my said previously patented form, fitted as a dirigible torpedo and embodying the principal features of my present invention. Fig. 2, is a plan view of the same. Figs. 3, 4, and 5 are cross-sectional views of the same, taken on the lines 3—3, 4—4, and 5—5, respectively. Fig. 6, is a diagrammatic view showing the said vessel fitted as a dirigible torpedo and provided with an electric exploding device, controllable by the attendant, and operated by exterior contact automatically to explode the vessel, and thereby sink or destroy its objective, either when its rams or is rammed thereby, in accordance with my invention. Fig. 7, is a longitudinal sectional view of a similar vessel arranged to discharge an automobile torpedo in accordance with my invention. Fig. 8, is a longitudinal sectional view of a similar vessel of modified form, equipped with other features of my invention.

Referring first to Figs. 1, 2, 3, 4, and 5, 10 designates the surface hull, which by preference is divided into compartments to be packed with cellulose as herein shown and as described in my said prior patent.

11 designates the submerged hull suspended from the surface hull, connected and communicating therewith through the waist 12 and carrying the vitals, consisting mainly of the motor, 13, which is here shown of the ordinary internal combustion form, the fuel tank 14, the propeller shaft 15, and propeller 16, the driving gear 17, the rudder 18, and the steering gear 19, which is connected with the steering wheel, 20, in the conning tower or controlling compartment 21, in the surface hull 10.

The motor exhaust muffler 22, and the compressed air accumulator 23, for starting the engine, not being vitals, are here shown placed in the surface hull, for after once going into action, the boat will not stop until it has done its work or is destroyed.

To reduce the cross-section and displacement of the submerged hull to a minimum and thereby increase the speed, maneuvering ability and seaworthiness of the vessel to a maximum, particularly in portable launches or vessels of small size where engine and torpedo rooms in the submerged hull would require excessive space in proportion to the space for motor power, I restrict the cross-section and displacement of the submerged hull closely to confine the motor 13, and connect the driving gear 17, and compressed air starting valve 24 with a motor control, here consisting of levers 25, in the armored conning tower 21, so that the attendant can start, stop or reverse the engine from the surface hull, under the protection of the armor of the conning tower.

The motor and rudder connections, as well as the necessary air for the motor, pass through openings of the waist 12, connecting the submerged and surface hulls, across which waist I provide an armored deck 26, to coöperate with the water intervening the two hulls around the waist in preventing fragments of shells, which might explode in the surface hull, from entering and damaging the submerged hull or its contents. Said armored deck I prefer to make in portable sections as shown, which may be lifted separately to give access to various parts of the motor for ordinary adjustments, repairs etc. But to give complete access to all parts of the motor for extraordinary adjustments, repairs etc., I provide the submerged hull with an outwardly removable section 27, covering the motor 13 and in this instance having the motor mounted within it. This removable section 27, by preference is normally held in place by packed flanges, bolts and nuts, 28, as best shown in Figs. 1 and 4, so that by lifting the vessel out of water, if small by a crane or davits, and if large on a marine railway or in a drydock, and detaching said nuts and bolts and the motor connections, the motor section and the contained motor may be dropped out of the submarine hull, and access thus given to all parts of the motor. In like manner the motor section and motor may easily be replaced in the submerged hull. I have also shown in the drawing the rear section 29 of the submerged hull carrying the rudder and steering gear and the propeller shaft and propeller, made removable in like manner and for similar reasons, from both the motor section and the surface hull.

In Fig. 1, I have shown the bow of the submerged hull 11 fitted with a charge 30 of high explosive, such as gun cotton, adapted to be exploded automatically by an ordinary torpedo firing pin 31, or other suitable exploding device operated by exterior contact. The charge 30 of high explosive is preferably contained in a detachable case or section 30½ of the submerged hull 11, so that it may be replaced by a dummy head in times of peace.

I sometimes prefer to increase the buoyancy of the vessel forward by prolonging the surface bow 32, beyond the bow of the submerged hull, as shown in Figs. 1 and 7, in which case I make the surface bow 32, relatively weak so that when the vessel rams its objective, the surface bow 32 will collapse and permit the firing pin 31, or its equivalent exploding device, to be actuated so as to explode the fixed torpedo thus formed by the explosive charge. The vessel thus arranged as a dirigible torpedo is intended to be driven and directed by the attendant, of which there may be one or more, toward the battleship or other hostile vessel until within striking distance; when the attendant locks the helm by any usual or suitable means provided for that purpose and leaves the vessel in a life buoy or attendant small boat. The vessel will then continue on its course like a giant torpedo until it rams and blows up the hostile vessel. The attendant in the life buoy or small boat being then out of action is safer from gun fire than when on an ordinary torpedo boat, and can be picked up at leisure by other boats when the engagement is over or its scene shifted.

In Fig. 7, I have shown a vessel of similar form fitted with an ordinary submerged bow torpedo tube 33, to discharge an ordinary automobile torpedo, instead of the fixed torpedo shown in Fig. 1. In either case it becomes necessary in this new form of patented vessel with the submerged hull restricted as described, to control the explosion of the fixed torpedo or the expulsion and ensuing explosion of the automobile torpedo from without the submerged hull, and to this end I connect the torpedo firing device in each case with a control accessible to the attendant in the surface hull.

In the case of the fixed torpedo shown in Fig. 1, the explosion control takes the form of a firing pin bolt 34, normally locking the firing pin against retraction and thus preventing the premature or accidental explosion of the fixed torpedo by floating logs or other floating or stationary obstructions, the bolt 34, being connected by a wire, as illustrated, with a handle or control 35 in the conning tower 21, so that the attendant therein may at the proper time withdraw the bolt 34, from the firing pin 31, and set the same ready for action.

In the case of the automobile torpedo vessel illustrated in Fig. 7, the torpedo control assumes the form of a compressed air pipe 36, leading from the compressed air accumulator 23, to the torpedo tube 33, for expelling the automobile torpedo from the torpedo tube 33, in the ordinary way, and having an air valve 36′ and valve control 37, in the conning tower 21, so that the attendant therein by opening the air valve may discharge the torpedo as soon as he has driven the vessel within striking distance of and aimed it at its objective.

In Fig. 6 I have illustrated diagrammatically another form of my explosion control in connection with means, I have also devised, to deter hostile vessels from attempting to ram my patented subsurface vessel when too small to carry a defensive battery.

The torpedo firing device, in this case (Fig. 6) takes the form of an ordinary electric detonator 38, to explode the fixed torpedo, or a light charge of explosive in the torpedo tube to expel the automobile torpedo, and an electric exploding circuit 39, connected with the detonator and including a circuit closer 40, normally held open by an electric magnet 41, when vitalized, but closing automatically when said magnet is devitalized. The explosion control in this case consists of a switch 42, in the conning tower 21, included in the exploding circuit 39, and an electric controlling circuit 43, including the electro-magnet 41, and another switch 44, in the conning tower 21, and extending across the bow firing pin 31, so as to be automatically broken when the vessel rams another vessel, and also extending around the sides of the upper hull 10, in proximity to the exterior thereof, so as to be automatically broken if the vessel should be rammed and its skin broken by a hostile vessel. By this arrangement, the attendant by opening the exploding switch 42, can effectually prevent the accidental or premature discharge of the explosive or torpedo, but by closing the exploding switch 42 and also the controlling switch 44, can set the torpedo before leaving the vessel so that the violent contact with the hostile vessel it rams, or is rammed by, will break the controlling circuit 43, and thus automatically devitalize the magnet 41, close the exploding circuit, discharge the explosive or torpedo and destroy the hostile vessel. Further, by closing the exploding switch 42, and opening the controlling switch 44, the attendant himself can, at any time, discharge the automobile torpedo, or, in desperate situations, the fixed charge of high explosive.

It is evident that by using my explosion device and control, surface boats, as well as my subsurface boats, may be fitted with a charge of high explosive and converted into practical dirigible or "human" giant torpedoes.

In Fig. 8, I have illustrated a modified form of my subsurface boat, arranged as a dirigible torpedo, as described and provided with means I have devised for giving it an excessively high speed, approximating that of the automobile torpedo, during the probable duration of its engagement, while retaining for it ample cruising speed and radius of action.

The preferred means here shown, consist of a compressed air or other fluid accumulator, 45, superheater 46, and turbine 47, on the propeller shaft 48, all protected in the submerged hull, as in an ordinary automobile torpedo, for driving the boat at its excessively high fighting speed; a motor control here consisting of a compressed air or fluid valve 49 in the conning tower for admitting the compressed air or fluid into the turbine; an ordinary internal combustion motor 51, in the surface hull, also connected to the shaft 48, for driving the boat at cruising speed when out of action; a controlling lever 52, in the conning tower and clutch 53 on the shaft 48, for enabling the attendant to throw either the cruising motor or racing turbine motor into action at will, and an air or fluid compressor or condenser 54, in the surface hull, arranged to be driven at will by the surface motor 51, for charging and replenishing the accumulator 45.

With the improvements above described, I have been able to build subsurface boats of the forms shown in Figs. 1 to 7, which with a length of less than 50 feet, and a draft of about 3½ feet, and a weight of only about 7 tons, can be carried aboard ship, can speed at a rate of between 23 and 28 miles an hour for nearly 200 miles, can turn almost in their own length, and owing to their high speed, small size, low freeboard, and comparative immunity from ramming and gun fire, can generally approach within striking range of a modern battle ship, cruiser or transport, before being put out of action. Certainly some of a squadron of these little destroyers would survive the fire of a hostile fleet long enough to strike, destroy or sink, with their giant fixed or automobile torpedoes. A large fleet of them can evidently be built for the cost of one torpedo boat destroyer or submarine, and several hundred of them for the cost of one battleship; they can be carried on shipboard across the seas with the battleship fleet, or to distant territories needing mobile defenses; and as they can be distributed or concentrated in fleets along the unprotected shores between fortified points, it is evident that these little destroyers will form an enormously valuable addition, either to the armored fleet or to the coast defenses of a nation.

It is evident that the form of my boat shown in Fig. 8, with its higher speed for a shorter time, may be preferred to the form shown in Figs. 1 to 7, in some situations.

Having thus set forth the nature of my invention and the mode in which I carry the same into practice, I claim as my invention:

1. A dirigible marine vessel consisting of a submerged hull suspended from and communicating with a surface hull, and having its motor control accessible to the attendant in the surface hull, the submerged hull comprising an outwardly removable section to give access to the motor closely confined therein.

2. A dirigible marine vessel consisting of a submerged hull suspended from and communicating with a surface hull and having a torpedo firing device in the submerged hull and a torpedo control accessible to the attendant in the surface hull.

3. A dirigible marine vessel carrying a charge of high explosive forming a fixed torpedo, a device operated by exterior contact automatically to explode the torpedo, and means controllable by the attendant on board for preventing the action of the torpedo exploding device.

4. A dirigible marine vessel consisting of a submerged hull suspended from and communicating with a surface hull, having a motor and a torpedo firing device in the submerged hull, and motor and torpedo controls accessible to the attendant in the surface hull.

5. A dirigible marine vessel carrying a fixed torpedo and a torpedo-exploding device extending around the hull in proximity to the exterior thereof so as to be operated automatically to explode the torpedo when the vessel is rammed on the side.

6. A dirigible marine vessel consisting of a submerged hull suspended from a surface hull and carrying a fixed torpedo with an automatic contact exploding device at the bow of the submerged hull, the bow of the surface hull being weakened so as to collapse rearwardly and allow the submerged exploding device to come into action when the vessel strikes its objective.

7. A dirigible marine vessel consisting of a submerged hull suspended from and communicating with a surface hull, having a compressed air or other fluid accumulator and propelling motor in the submerged hull, and means accessible to the attendant in the surface hull for controlling the supply of compressed air or fluid from the accumulator to the motor.

8. A dirigible marine vessel consisting of a submerged hull suspended from and communicating with a surface hull, having a compressed air or other fluid accumulator and propelling motor in the submerged hull and a propelling motor also in the surface hull.

9. A dirigible marine vessel consisting of a submerged hull suspended from and communicating with a surface hull, having a compressed air or other fluid accumulator and motor in the submerged hull, a motor in the surface hull, a propeller, and means for connecting either the surface motor or the submerged motor with, or disconnecting them from the propeller.

10. A dirigible marine vessel consisting of a submerged hull suspended from and communicating with a surface hull having a compressed gas or other fluid accumulator and propelling motor in the submerged hull, a motor and fluid condenser in the surface hull, means for connecting the surface motor with the fluid condenser and means for connecting the surface motor with the propeller at the will of the attendant.

In testimony whereof I have hereunto set my hand the 27th day of November 1909.

CLARENCE LIVINGSTON BURGER.

In presence of—
 GEO. W. SIMERS, Jr.,
 JOHN A. DUTTON.